(12) United States Patent
Ogiya

(10) Patent No.: US 6,290,399 B1
(45) Date of Patent: Sep. 18, 2001

(54) OPTICAL SUBMARINE BRANCHING UNIT

(75) Inventor: Shuji Ogiya, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,588

(22) Filed: Mar. 3, 1998

(30) Foreign Application Priority Data

Oct. 13, 1997 (JP) .................................................. 9-278896

(51) Int. Cl.⁷ ...................................................... G02B 6/36
(52) U.S. Cl. ........................... 385/53; 385/100; 385/138; 174/70 S; 174/71 R
(58) Field of Search .................................. 385/134–139, 385/97.112, 100, 147, 53; 174/70 R, 71 R, 72 R, 70 S; 114/242

(56) References Cited

U.S. PATENT DOCUMENTS

| 4,441,786 | * | 4/1984 | Hulin et al. | 385/139 |
| 4,773,728 | * | 9/1988 | Kershaw | 385/97 |
| 4,784,461 | * | 11/1988 | Abe et al. | 385/112 |
| 5,673,644 | * | 10/1997 | Vanasse et al. | 114/242 |
| 5,726,388 | * | 3/1998 | Ferland | 174/72 A |
| 5,838,871 | * | 11/1998 | Lebert et al. | 385/135 |

* cited by examiner

Primary Examiner—Brian Healy
Assistant Examiner—Sarah N. Song
(74) Attorney, Agent, or Firm—Staas & Halsey, LLP

(57) ABSTRACT

An optical submarine branching unit for branching a trunk cable into first and second branch cables, including a pressure housing having a cylinder and first and second covers, a branching circuit unit accommodated in the pressure housing, a first feed through assembly mounted to the first cover so as to extend therethrough, for introducing optical fibers of the trunk cable into the pressure housing, and second and third feed through assemblies mounted to the second cover so as to extend therethrough, for introducing optical fibers of the first and second branch cables into the pressure housing, respectively. The branching circuit unit has a feeding unit and an optical circuit unit completely separated from the feeding unit. Each feed through assembly includes a sleeve and a pin inserted in the sleeve. The pin has a plurality of bosses each having a plurality of axial grooves. Multiple layers of optical fibers are received in each axial groove and extend along the pin.

11 Claims, 11 Drawing Sheets

OPTICAL SUBMARINE BRANCHING UNIT

BACKGROUND OF THE INVENTION

1. Field of the Invention

The present invention relates to an optical submarine branching unit.

2. Description of the Related Art

An optical submarine cable transmission system is widely used as international and domestic communications means, which is due to its higher transmission quality such as excellence in noise and delay time, and security over satellite communications or other conventional radio communications by means of short waves. In the optical submarine cable transmission system, a plurality of optical submarine repeaters are provided at given intervals to prevent degradation in transmission characteristics of an optical submarine cable and amplify signals. Each submarine repeater is driven by a constant current supplied from a feeding device installed on the land.

Thus, the optical submarine cable transmission system is composed mainly of an optical submarine cable and a plurality of optical submarine repeaters inserted in the optical submarine cable at given intervals. The system further includes an optical submarine branching unit for branching the optical submarine cable into a plurality of transmission lines in the sea, because many optical fibers are accommodated in the optical submarine cable and wavelength division multiplexed optical signals are transmitted in each optical fiber. The optical submarine branching unit is used generally to branch a trunk cable into first and second branch cables. Such an optical submarine branching unit is installed between optical submarine repeaters or between an optical submarine repeater and a land terminal device.

A conventional optical submarine branching unit has only a function of extracting a specific wavelength. Accordingly, in the case that optical signals having different wavelengths are to be separately received by individual terminal stations, it is necessary to design an optical submarine branching unit according to wavelength. That is, many kinds of optical submarine branching unit according to the number of wavelengths to be branched must be installed. Such an increase in kind of optical submarine branching unit causes an increase in number of preliminary optical submarine branching units that must be respectively added to the existing optical submarine branching units. Further, the increase in kind of optical submarine branching unit causes another problem that different components must be manufactured for the different branching units and different tests must also be made, resulting in a reduction in manufacturability.

To solve the above problems, a branching circuit unit accommodated in the branching unit must include a plurality of optical filter circuits each having a function of reflecting light having only a specific wavelength of plural wavelengths and an optical circulator having a function of transmitting light cyclically in a given direction. Further, it is essential to develop a system in which input/output portions of all the optical filter circuits and input/output portions of the optical circulator are introduced into a pressure housing of the branching unit through feed through elements provided in cover assemblies of the pressure housing, and a required wavelength is selected outside of the pressure housing by cable jointing installation.

SUMMARY OF THE INVENTION

It is therefore an object of the present invention to provide an optical submarine branching unit which can branch a plurality of different desired wavelengths as required.

In accordance with an aspect of the present invention, there is provided an optical submarine branching unit for branching a trunk cable having a plurality of optical fibers into first and second branch cables each having a plurality of optical fibers, comprising a pressure housing comprising a cylinder and first and second covers fixed to the opposite ends of said cylinder; a branching circuit unit accommodated in said pressure housing; a first feed through assembly mounted to said first cover so as to extend therethrough, for introducing said optical fibers of said trunk cable into said pressure housing; and second and third feed through assemblies mounted to said second cover so as to extend therethrough, for introducing said optical fibers of said first and second branch cables into said pressure housing, respectively.

The branching circuit unit includes a feeding unit and a plurality of optical circuit units completely separated from the feeding unit. Preferably, each optical circuit unit is accommodated in a case, and the number of the optical circuit units is changed as required.

Each of the first, second, and third feed through assemblies includes a sleeve fixed to the first or second cover, and a pin inserted in the sleeve and having a plurality of bosses. Each of the bosses has a plurality of axial grooves each for receiving multiple layers of optical fibers extending along the pin. Further, a spacing between the sleeve and the pin is hermetically sealed by a solder.

The case comprises a base plate and a pair of transparent covers mounted on the opposite sides of the base plate. An optical circulator is mounted on one surface of the base plate, and an optical filter is mounted on the other surface of the base plate. The number of the optical circuit units can be changed according to the number of wavelengths of signal light to be branched.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
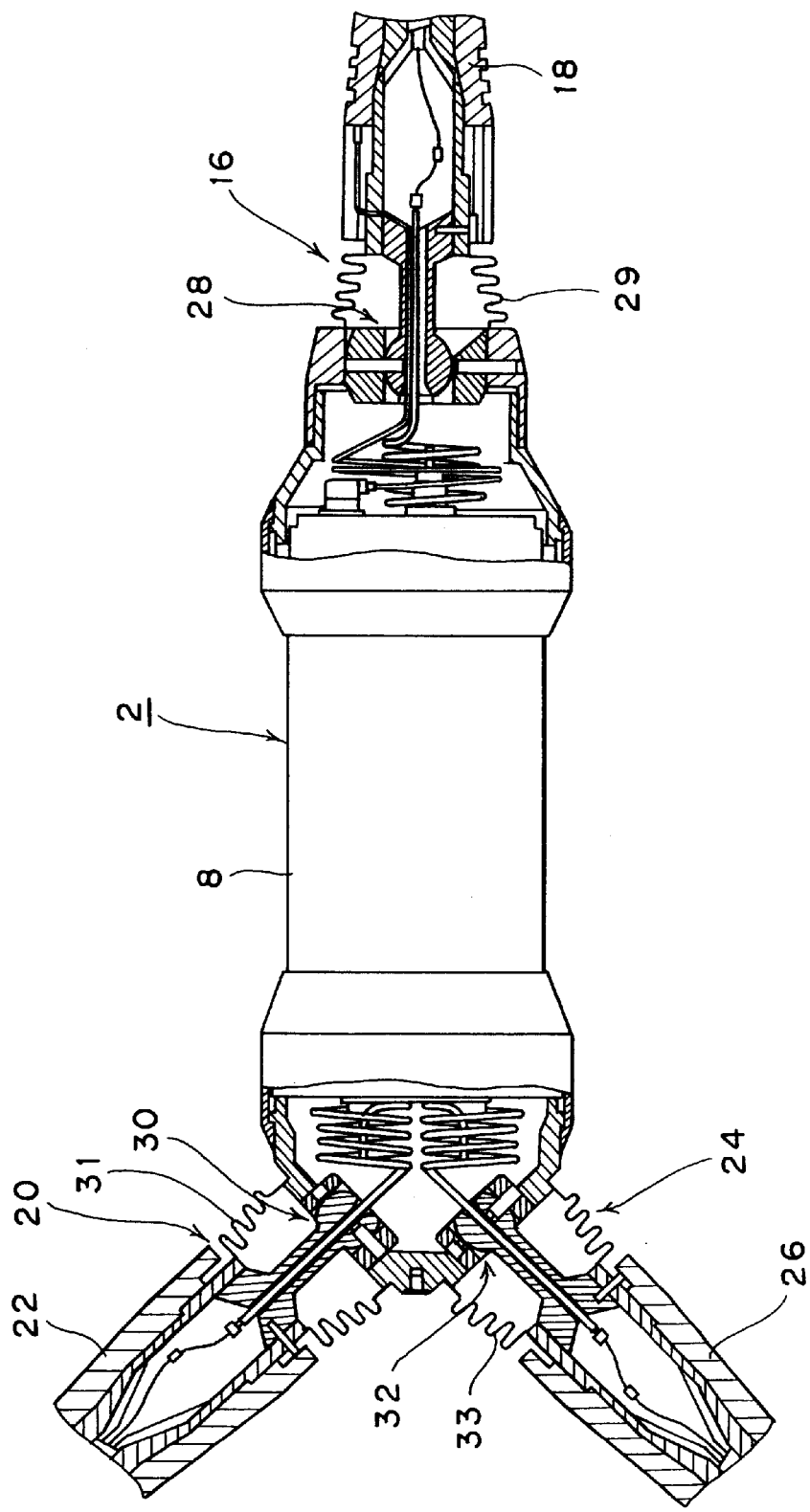
FIG. 1 is a partially sectional view of an optical submarine branching unit according to the present invention.
Figure 2:
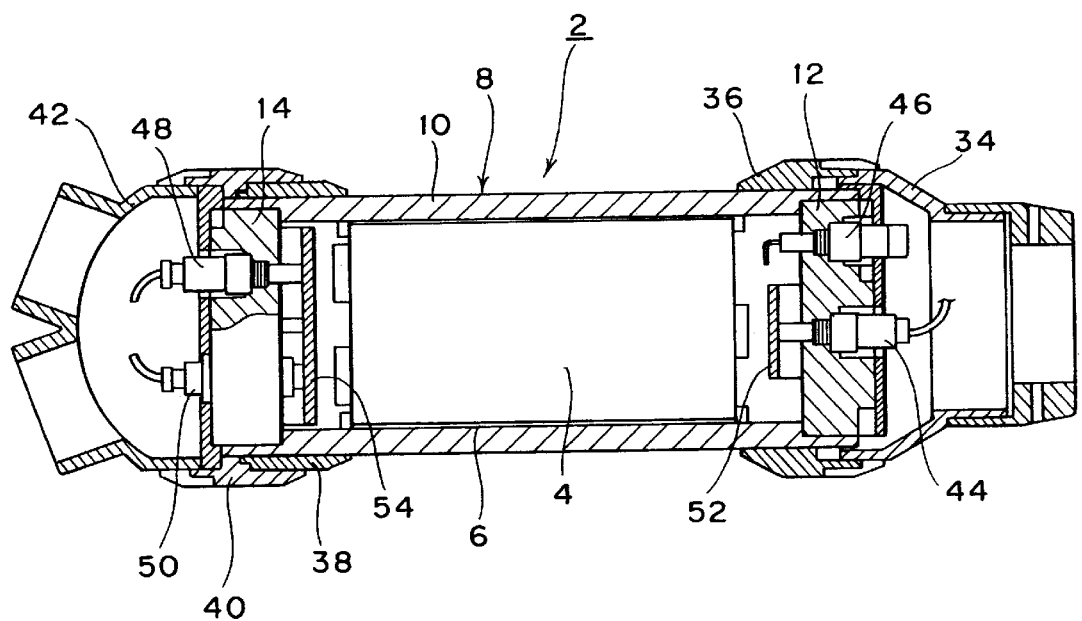
FIG. 2 is a sectional view of an essential part of the optical submarine branching unit shown in FIG. 1.

Referring to FIG. 1, there is shown a partially sectional view of an optical submarine branching unit 2 to which the present invention is applicable. FIG. 2 is a sectional view of an essential part of the optical submarine branching unit 2 shown in FIG. 1. As shown in FIG. 2, an optical branching circuit unit 4 is accommodated in a pressure housing 8 through a cushion member 6. The pressure housing 8 includes a cylinder 10 and covers 12 and 14 welded to the opposite ends of the cylinder 10. The pressure housing 8 is formed of beryllium copper, for example.

As shown in FIG. 1, the optical submarine branching unit 2 such as an optical submarine repeater is connected at one end thereof through a trunk-side coupling 16 to a trunk cable 18, and connected at the other end through branch-side couplings 20 and 24 respectively to branch cables 22 and 26. The trunk-side coupling 16 includes a gimbal 28. The gimbal 28 allows displacement of the trunk cable 18 in any directions with respect to the optical submarine branching unit 2.

Similarly, the branch-side couplings 20 and 24 include gimbals 30 and 32, respectively. The gimbals 30 and 32 allow displacements of the branch cables 22 and 26 in any directions with respect to the optical submarine branching unit 2, respectively. The gimbal 28 is accommodated in a gimbal housing 29, and the gimbals 30 and 32 are accommodated in gimbal housings 31 and 33, respectively.

Referring again to FIG. 2, a feed through assembly 44 and a sea ground feed through assembly 46 are mounted to the cover 12 so as to extend therethrough. On the other hand, feed through assemblies 48 and 50 are mounted to the cover 14 so as to extend therethrough. A fiber accommodating structure 52 is provided inside of the cover 12 in adjacent relationship to the feed through assembly 44, and a fiber accommodating structure 54 is provided inside of the cover 14 in adjacent relationship to the feed through assemblies 48 and 50. A main joint ring 34 is connected through an adapter ring 36 to the pressure housing 8, and a branch joint ring 42 is connected through adapter rings 38 and 40 to the pressure housing 8.

Figure 3:
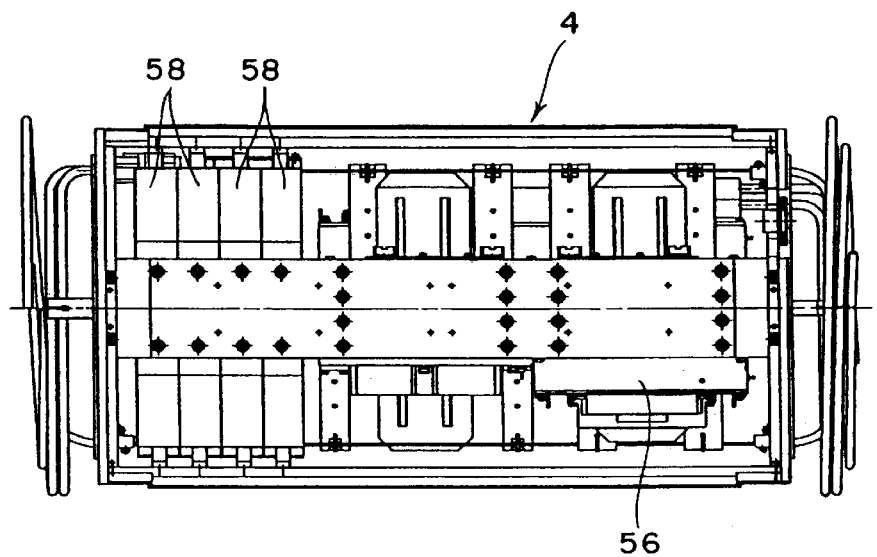
FIG. 3 is an elevational view of an optical branching unit according to the present invention.
Figure 4:
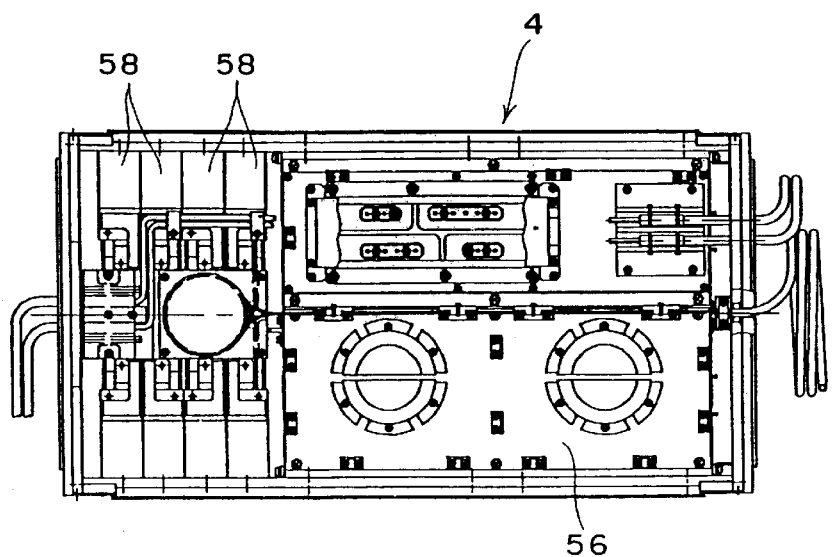
FIG. 4 is a plan view of the optical branching unit shown in FIG. 3.
Figure 5:
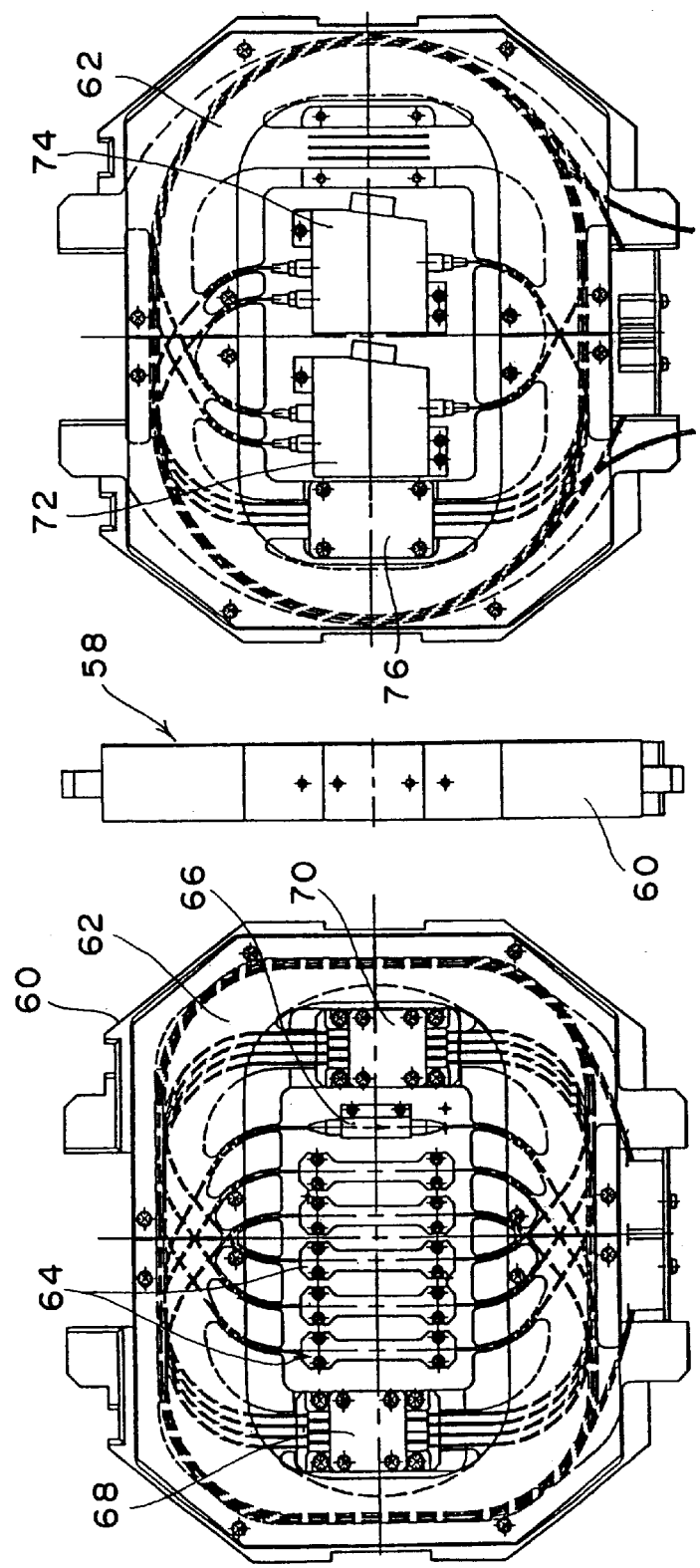
FIG. 5A is an elevational view of an optical circuit unit according to the present invention.
FIG. 5B is a right side view of FIG. 5A.
FIG. 5C is a left side view of FIG. 5A.

FIGS. 3 and 4 are an elevational view and a plan view of the optical branching circuit unit 4 respectively. As apparent from FIGS. 3 and 4, the optical branching circuit unit 4 according to the present invention includes a feeding unit 56 and a plurality of optical circuit units 58, and these units 56 and 58 are completely separated from each other. As shown in FIGS. 5A to 5C, each optical circuit unit 58 is accommodated in a case 60 having a base plate 62. As shown in FIG. 5B, optical circulators 72 and 74 are mounted on one surface of the base plate 62. Reference numeral 76 denotes a fiber splice portion.

On the other hand, as shown in FIG. 5C, an optical isolator 66 and a plurality of fiber gratings 64 are mounted on the other surface of the base plate 62. Each fiber grating 64 functions as an optical filter for reflecting light having a given wavelength and transmitting light having the other wavelengths. Reference numerals 68 and 70 denote fiber splice portions. The opposite sides of the case 60 are covered with transparent plastic covers, thereby completely accommodating the optical circuit unit 58 in the case 60. The number of the cases 60 mounted can be changed according to the number of wavelengths of light to be branched by the optical submarine branching unit 2, thereby supporting any system design conditions.

Figure 6:
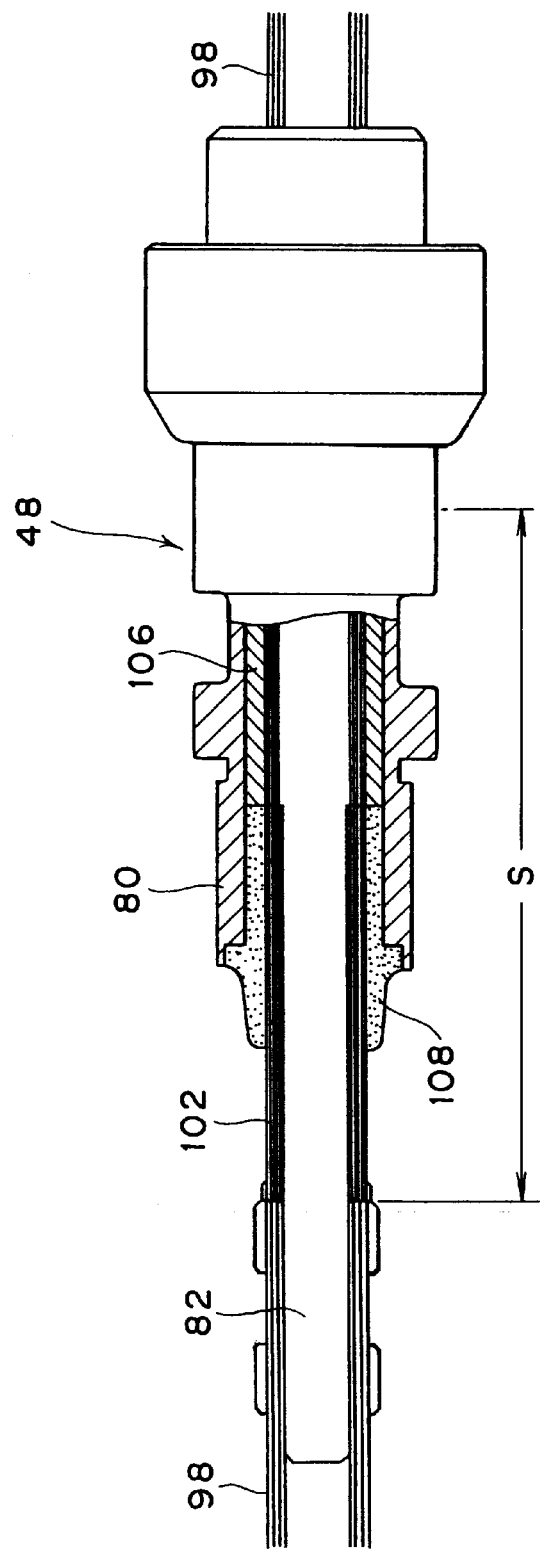
FIG. 6 is a partially sectional view of a feed through assembly according to the present invention.
Figure 7:
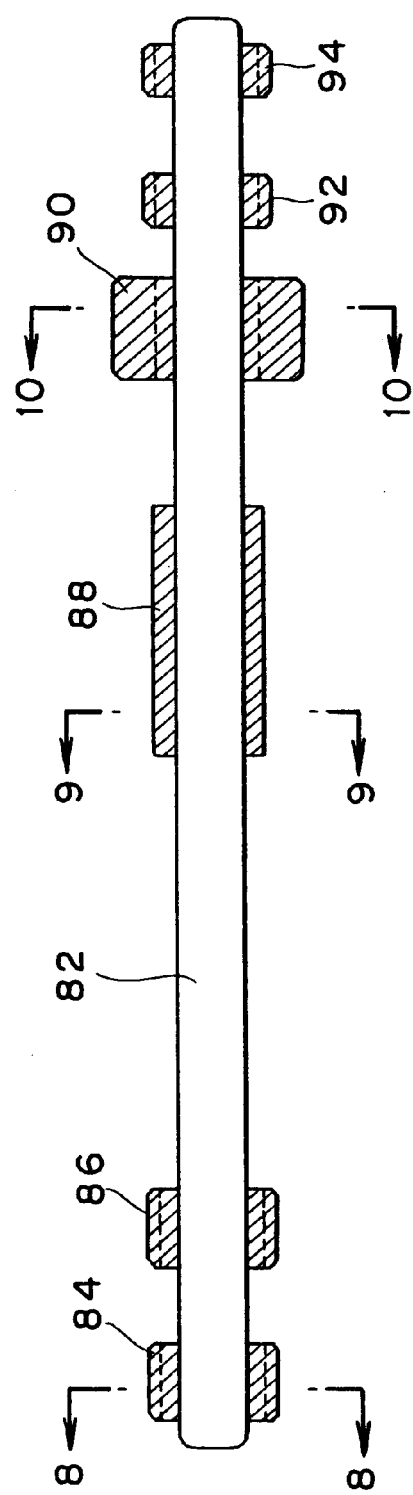
FIG. 7 is a sectional view of a pin shown in FIG. 6.

Referring to FIG. 6, there is shown a detailed structure of the feed through assembly 48. Each of the other feed through assemblies 44 and 50 has a similar structure, so the structure of the feed through assembly 48 only will be described for simplicity of illustration. The feed through assembly 48 includes a sleeve 80 of metal such as beryllium copper, fixed to the cover 14 so as to extend therethrough. A pin 82 of metal is inserted in the sleeve 80. As shown in FIG. 7, the pin 82 is integrally formed with a plurality of bosses 84, 86, 88, 90, 92, and 94.

Figure 8:
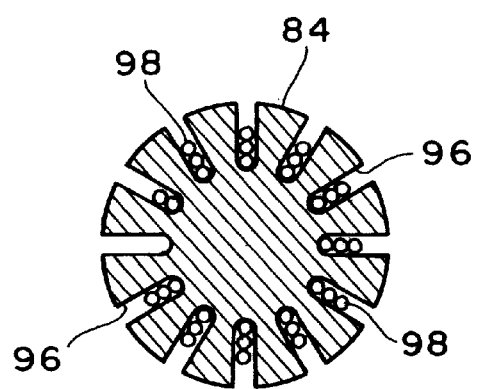
FIG. 8 is a cross section taken along the line 8—8 in FIG. 7.
Figure 9:
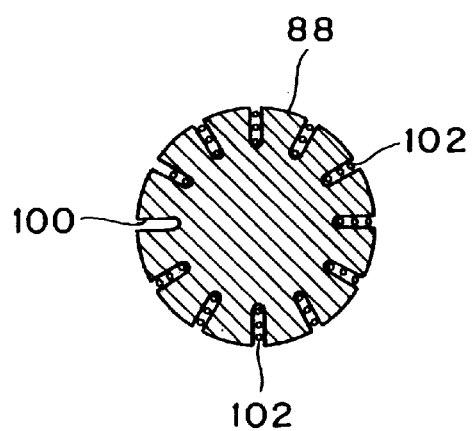
FIG. 9 is a cross section taken along the line 9—9 in FIG. 7.
Figure 10:
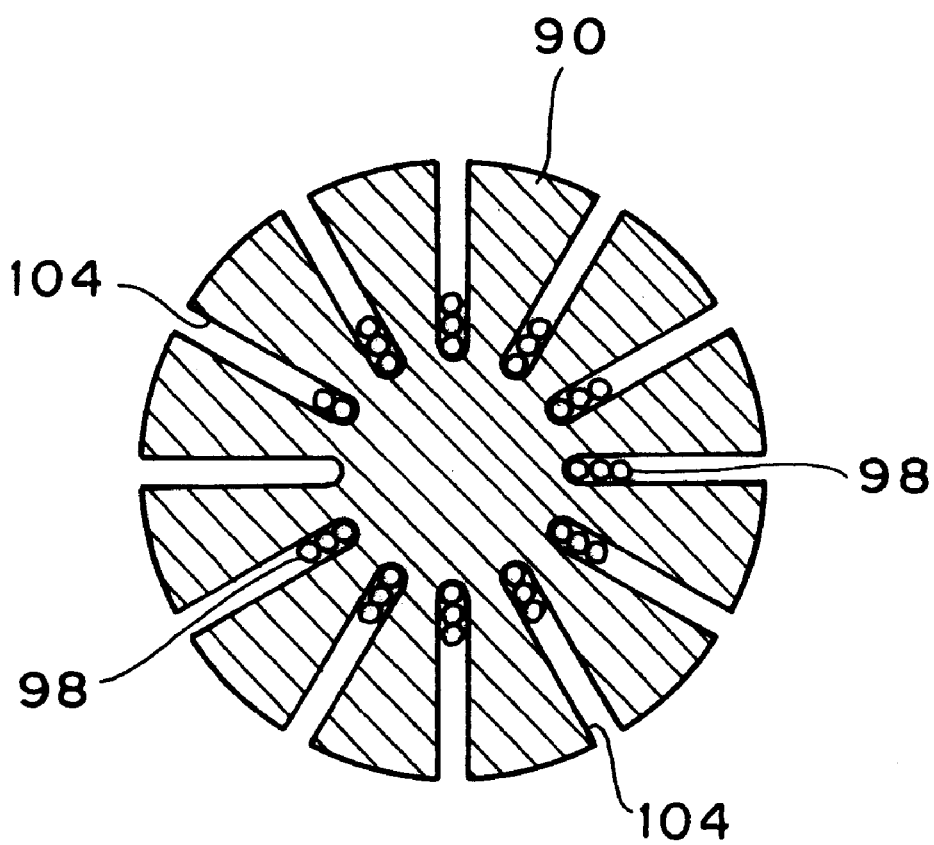
FIG. 10 is a cross section taken along the line 10—10 in FIG. 7.

As shown in FIG. 8, the boss 84 is formed with a plurality of axial grooves 96, and three layers of optical fibers 98 each having a secondary coating are received in each axial groove 96. Similarly, as shown in FIG. 9, the boss 88 also has a plurality of axial grooves 100, and three layers of optical fibers 102 each having no secondary coating are received in each axial groove 100. Further, as shown in FIG. 10, the boss 90 also has a plurality of axial grooves 104, and three layers of optical fibers 98 each having a secondary coating are received in each axial groove 104. Although not shown, each of the other bosses 86, 92, and 94 also has a plurality of axial grooves, and three layers of optical fibers each having a secondary coating are received in each axial groove.

Referring again to FIG. 6, the plural optical fibers 98 and 102 extend along the pin 82 in such a manner that they are stacked in each groove of each boss of the pin 82. In FIG. 6, reference symbol S denotes the region or range of extension of the optical fibers 102 each having no secondary coating. A cylindrical spacer 106 is interposed between the sleeve 80 and the pin 82, and a spacing between a left end portion of the sleeve 80 and the pin 82 is hermetically sealed by a solder 108. Further, a spacing between the sleeve 80 and the cover 14 is also hermetically sealed.

Each optical fiber 98 is provided along the pin 82 as applying a tension of about 10 grams to each optical fiber 98, and the solder 108 is applied between the sleeve 80 and the pin 82 to effect the hermetic sealing. The structure of each of the feed through assemblies 44 and 50 is similar to the structure of the feed through assembly 48. Thus, multiple layers of optical fibers are received in each axial groove of each boss of the pin 82, so that a large number of optical fibers can be introduced through the feed through assemblies 44, 48, and 50 into the branching circuit unit 4.

Figure 11:
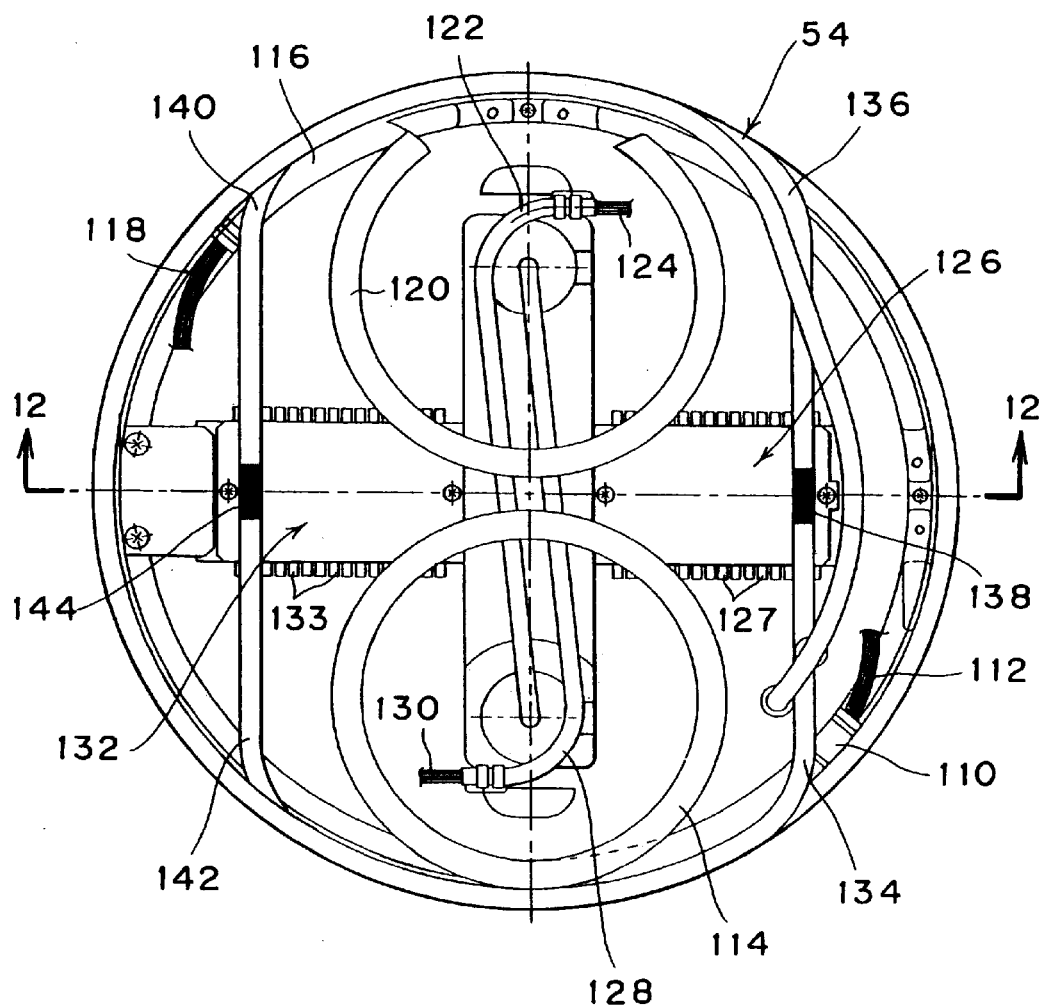
FIG. 11 is a schematic view of a fiber accommodating structure according to the present invention.

Referring to FIG. 11, there is shown a schematic view of the fiber accommodating structure 54 shown in FIG. 2. Optical fibers 112 from a unit-side cable 110 and optical fibers 124 from a tail cable 122 are connected together in a fiber connecting and reinforcing portion 126. The fiber connecting and reinforcing portion 126 includes a plurality of pipes 127 in which connected portions of the optical fibers 112 and 124 are inserted and reinforced. The tail cable 122 is connected to the branch cable 22 shown in FIG. 1. Similarly, optical fibers 118 from a unit-side cable 116 and optical fibers 130 from a tail cable 128 are connected together in a fiber connecting and reinforcing portion 132. The fiber connecting and reinforcing portion 132 includes a plurality of pipes 133 in which connected portions of the optical fibers 118 and 130 are inserted and reinforced. The tail cable 128 is connected to the branch cable 26 shown in FIG. 1.

Figure 12:
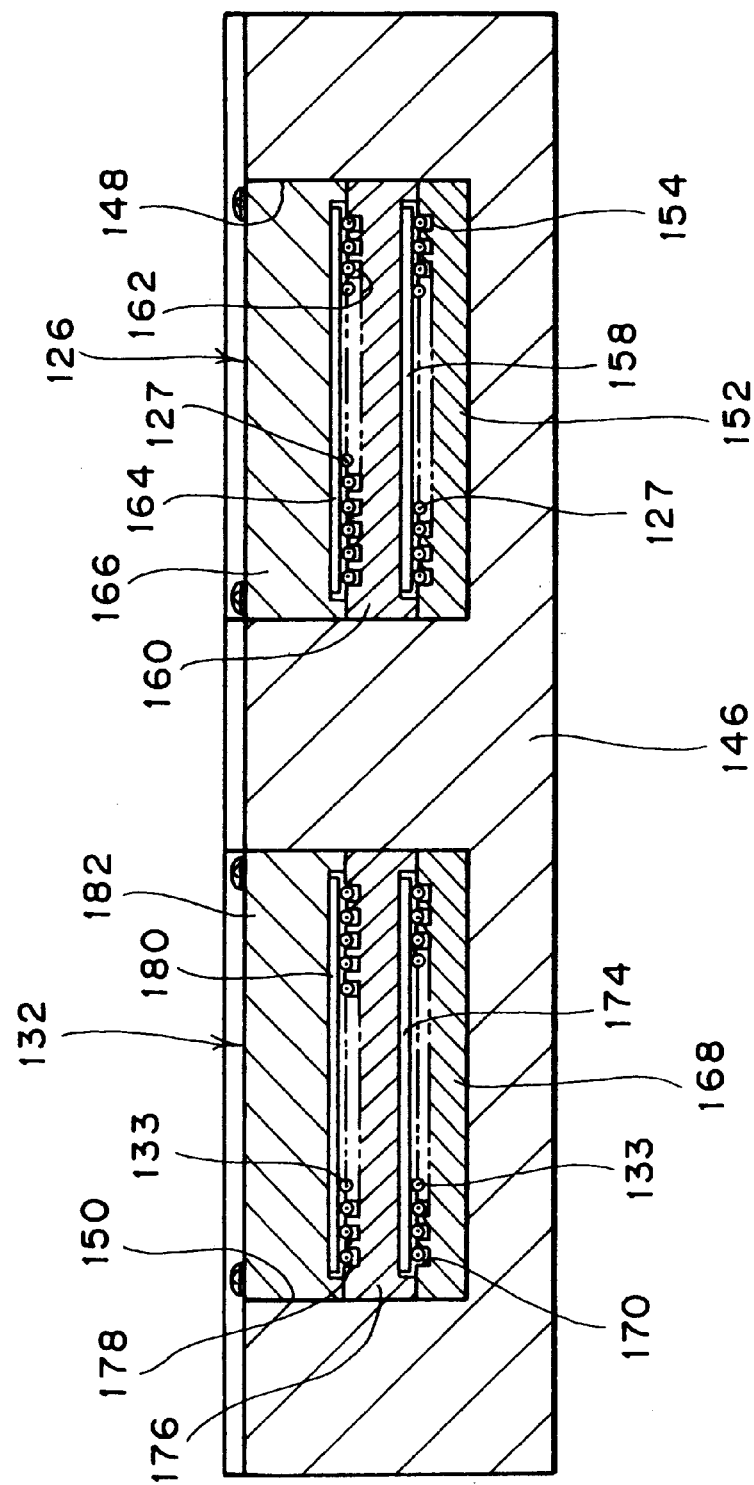
FIG. 12 is a cross section taken along the line 12—12 in FIG. 11.

A part of the optical cable 110 is accommodated in a polyethylene tube 114, and a part of the optical cable 116 is accommodated in a polyethylene tube 120. A unit-side feeder 134 and a cover-side feeder 136 are connected together at 138, and a unit-side feeder 140 and a cover-side feeder 142 are connected together at 144. As shown in FIG. 12, each of the fiber connecting and reinforcing portions 126 and 132 has a multilayer structure. That is, two recesses 148 and 150 are formed in a base member 146.

A plate 152 having a plurality of grooves 154 is received in the recess 148, and a pipe 127 accommodating a fiber connected portion is received in each groove 154. A plate 160 having a plurality of grooves 162 is placed on the plate 152 through a silicone rubber cushion 158, and a pipe 127 accommodating a fiber connected portion is received in each groove 162. Further, a cover 166 is placed on the plate 160 through a silicone rubber cushion 164. The cover 166 is secured to the plates 152 and 160 by a plurality of screws.

The fiber connecting and reinforcing portion 132 is similar in structure to the fiber connecting and reinforcing portion 126. That is, a plate 168 having a plurality of grooves 170 is received in the recess 150, and a pipe 133 accommodating a fiber connected portion is received in each groove 170. A plate 176 having a plurality of grooves 178 is placed on the plate 168 through a silicone rubber cushion 174, and a pipe 133 accommodating a fiber connected portion is received in each groove 178. A cover 182 is placed on the plate 176 through a silicone rubber cushion 180. The cover 182 is secured to the plates 168 and 176 by a plurality of screws.

Figure 13:
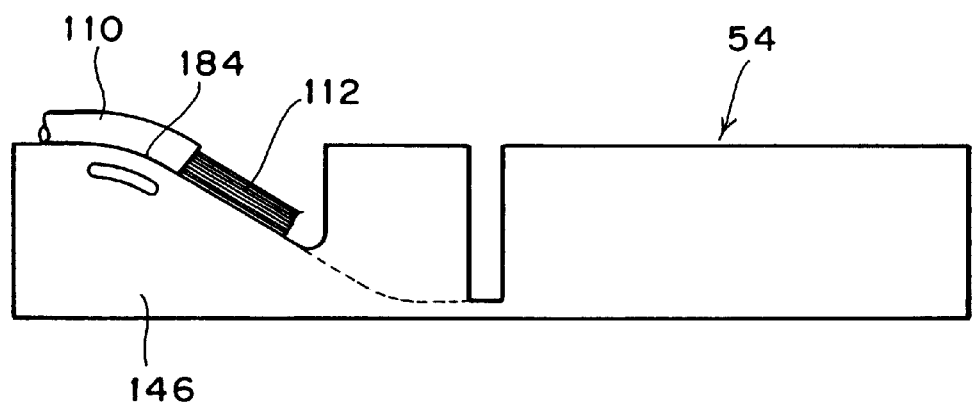
FIG. 13 is a right side view of FIG. 11.

Referring to FIG. 13, there is shown a right side view of FIG. 11. The base 146 is formed with a curved portion 184, and the optical cable 110 is fixed to the base 146 so as to extend along the curved portion 184. The curved portion 184 has a radius of curvature not less than the minimum bend radius of the optical fibers 112. In the fiber accommodating structure of this preferred embodiment, each fiber connecting and reinforcing portion has a multilayer configuration, so that the connected portions of a large number of optical fibers can be accommodated in a limited space.

According to the present invention as described above, a plurality of different desired wavelengths can be branched as required by a single optical submarine branching unit.

What is claimed is:

1. An optical submarine branching unit for branching a trunk cable having a plurality of optical fibers into first and second branch cables each having a plurality of optical fibers, comprising:
   a pressure housing comprising a cylinder and first and second covers fixed to the opposite ends of said cylinder;
   a branching circuit unit accommodated in said pressure housing;
   a first feed through assembly mounted to said first cover so as to extend therethrough, for introducing said optical fibers of said trunk cable into said pressure housing; and
   second and third feed through assemblies mounted to said second cover so as to extend therethrough, for introducing said optical fibers of said first and second branch cables into said pressure housing, respectively;
   said branching circuit unit including a feeding unit and an optical circuit unit separated from said feeding unit;
   each of said first, second, and third feed through assemblies including a sleeve fixed to said first or second cover, and a pin inserted in said sleeve and having a plurality of bosses, each of said bosses having a plurality of axial grooves each for receiving multiple layers of optical fibers extending along said pin, a spacing between said sleeve and said pin being hermetically sealed by a solder.

2. An optical submarine branching unit according to claim 1, wherein said optical circuit unit comprises:
   a case having a base plate and a pair of covers mounted on the opposite sides of said base plate;
   an optical circulator mounted on one surface of said base plate; and
   an optical filter mounted on the other surface of said base plate.

3. An optical submarine branching unit according to claim 2, wherein said optical circuit unit comprises a plurality of optical circuit units, the number of said optical circuit units to be mounted being selected according to the number of optical signals to be transmitted.

4. An optical submarine branching unit according to claim 1, further comprising:
   a first fiber accommodating assembly for connecting said optical fibers of said branching circuit unit and said optical fibers of said trunk cable and accommodating them together; and
   a second fiber accommodating assembly for connecting said optical fibers of said branching circuit unit and said optical fibers of said first and second branch cables and accommodating them together;
   each of said first and second fiber accommodating assemblies comprising:
      a plurality of plates stacked and fixed together, each of said plates having a plurality of grooves; and
      a reinforcing pipe received in each of said grooves of each plate, for accommodating a connected portion of each optical fiber.

5. An apparatus comprising:
   optical submarine branching unit for an optical transmission system, the optical submarine branching unit branching a first cable having a plurality of optical fibers for transmitting optical signals into second and third cables each having a plurality of optical fibers for transmitting optical signals, the optical submarine branching unit comprising
   first, second and third feed through assemblies corresponding, respectively, to the first, second and third cables, each feed through assembly introducing optical fibers of the corresponding cable into the optical submarine branching unit and including
      a sleeve, and
      a pin inserted in the sleeve and having a plurality of bosses, each boss having a plurality of axial grooves each for receiving multiple layers of optical fibers extending along the pin and being from the corresponding cable.

6. An apparatus according to claim 5, wherein, in each feed through assembly, a space exists between the sleeve and the pin, the space being hermetically sealed by a solder.

7. An apparatus comprising:
   optical submarine branching unit for an optical transmission system, the optical submarine branching unit comprising
   a feed through assembly introducing optical fibers for transmitting optical signals from a cable into the optical submarine branching unit, wherein the feed through assembly includes
      a sleeve, and
      a pin inserted in the sleeve and having a plurality of bosses, each boss having a plurality of axial grooves each for receiving multiple layers of optical fibers extending along the pin and being from the cable.

8. An apparatus according to claim 7, wherein a space exists between the sleeve and the pin, the space being hermetically sealed by a solder.

9. An apparatus comprising:

a feed through assembly introducing optical fibers for transmitting optical signals from a cable into an optical submarine branching unit of an optical transmission system, the feed through assembly comprising a sleeve, and a pin inserted in the sleeve and having a plurality of bosses, each boss having a plurality of axial grooves each for receiving multiple layers of optical fibers extending along the pin and being from the cable.

10. An apparatus according to claim 9, wherein a space exists between the sleeve and the pin, the space being hermetically sealed by a solder.

11. An apparatus according to claim 9, wherein a space exists between the sleeve and the pin, the feed through assembly further comprising:

means for hermetically sealing the space.

* * * * *